United States Patent [19]

Koksbang

[11] Patent Number: 5,411,764
[45] Date of Patent: May 2, 1995

[54] METHOD OF MAKING LITHIUM ELECTRODE

[75] Inventor: Rene Koksbang, San Jose, Calif.

[73] Assignee: Valence Technology, Inc., San Jose, Calif.

[21] Appl. No.: 259,746

[22] Filed: Jun. 14, 1994

Related U.S. Application Data

[63] Continuation of Ser. No. 40,226, Mar. 30, 1993, abandoned.

[51] Int. Cl.6 .......................... B05D 1/28; B05D 1/30
[52] U.S. Cl. ................... 427/383.7; 427/383.1; 427/398.2; 427/431; 427/432; 118/59; 118/259; 164/98; 164/487
[58] Field of Search ............... 427/383.1, 383.7, 398.2, 427/431, 432; 118/59, 259; 164/98, 487

[56] References Cited

U.S. PATENT DOCUMENTS

| 4,824,746 | 4/1989 | Belanger et al. |
| 4,830,939 | 5/1989 | Lee et al. |
| 4,911,995 | 3/1990 | Belanger et al. |
| 5,011,501 | 4/1991 | Shackle et al. |
| 5,037,671 | 8/1991 | Kärnä et al. .......... 118/259 |
| 5,080,932 | 1/1992 | Koksbang et al. .......... 427/398.2 |

*Primary Examiner*—Shrive Beck
*Assistant Examiner*—Brian K. Talbot
*Attorney, Agent, or Firm*—Linda M. Deschere

[57] ABSTRACT

The thin film electrode is prepared by first forming a bath of a molten lithium material in a vessel. The molten lithium containing material is selected among lithium, a lithium alloy and lithium containing compounds. A substrate is coated with a thin layer of the molten material by transporting the substrate below the vessel where it contacts the molten lithium material.

19 Claims, 1 Drawing Sheet

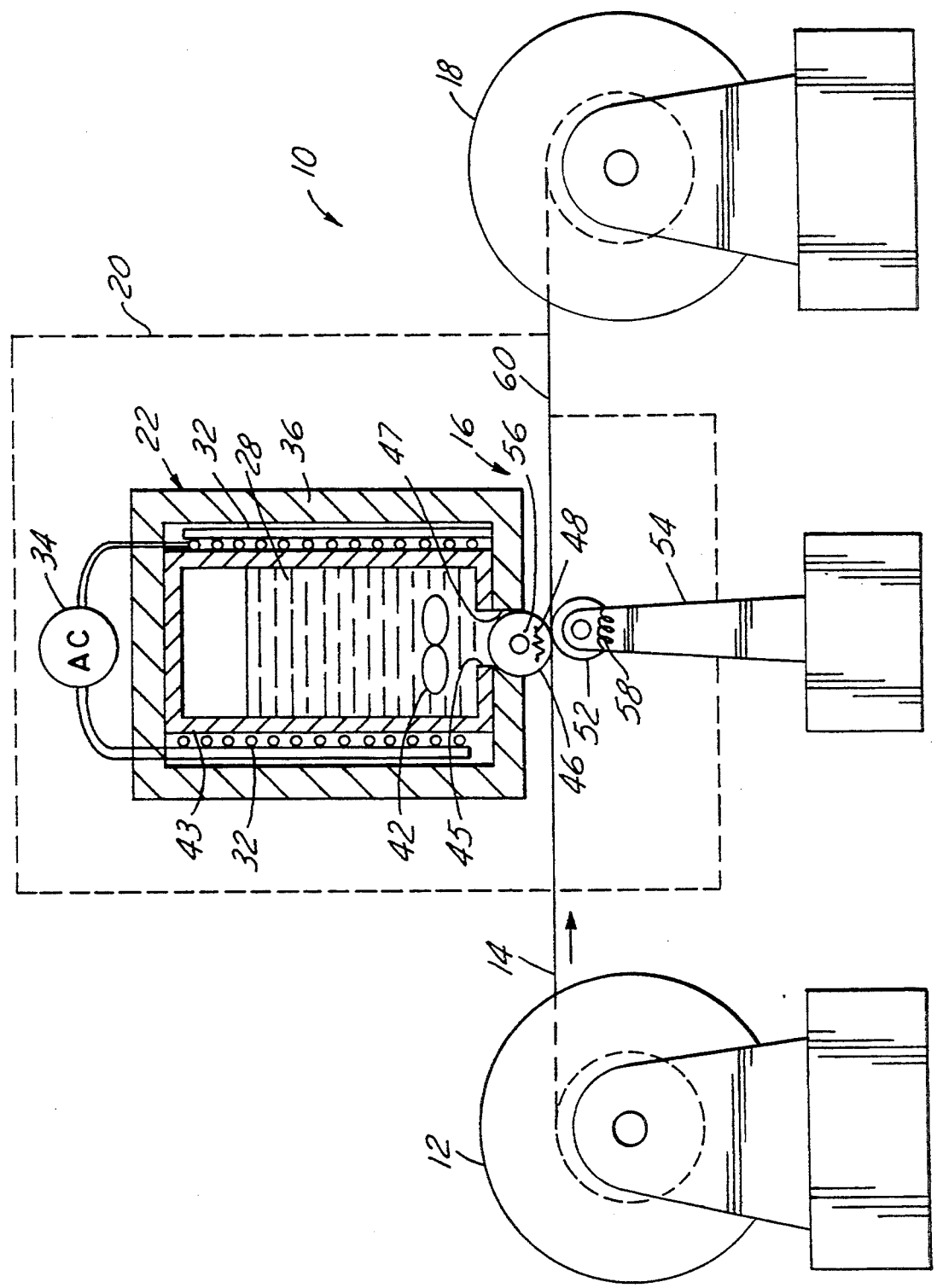

METHOD OF MAKING LITHIUM ELECTRODE

This is a continuation of application Ser. No. 08/040,226, filed of Mar. 30, 1993, now abandoned.

FIELD OF THE INVENTION

This invention relates to thin electrodes of lithium and a process for their preparation. More specifically, the present invention relates to a process for manufacturing thin electrodes of lithium or alloys or compounds thereof supported on a substrate and particularly electrically conductive substrates.

BACKGROUND OF THE INVENTION

Electrochemical devices employing thin layer lithium electrodes are the subject of intense investigation. Typical electrochemical devices or batteries include a lithium anode, a transition metal oxide composite cathode, and an electrolyte which is typically a solid or liquid and which includes a dissolved lithium salt. These new batteries all rely on the technology based on thin films where current densities are low with the result that they promote good redeposition and cycling of the lithium anode. This has lead to the need to produce thinner and thinner lithium electrodes. The utilization and handling of thin lithium electrodes are relatively easy when the thickness of such electrodes remain above about 100 microns. However, due to the softness of lithium, handling of thin lithium films or foils of a thickness of less than about 100 microns, as desired for new lithium batteries, is very difficult. This means that thin lithium films are extremely difficult to handle in continuous processes for manufacturing and assembling batteries. As a result, typically the thickness of present lithium films is six times greater than necessary, as compared to the capacity of the cathode with which it is used. Excess lithium is in fact undesirable and even detrimental because lithium is wasted, the battery is more expensive and substantially thicker than necessary, and the density of stored energy, expressed in terms of energy per unit volume and/or weight is lessened.

Therefore, what is needed is a method to overcome the above mentioned difficulties and to produce electrodes of very thin lithium films economically and in a continuous process.

SUMMARY OF THE INVENTION

The invention provides a process for manufacturing thin lithium electrodes. In one embodiment, the electrodes are formed on a substrate which may comprise the metal current collector. The preferred metal is selected from the group consisting of copper, nickel, iron and other conductive metals or alloys thereof. In practice, a nickel substrate is preferred.

The thin film electrode is prepared by first forming a bath of a molten lithium containing material in a vessel. The molten lithium containing material is selected among lithium, a lithium alloy and lithium containing compounds. A substrate is coated with a thin layer of the molten material by transporting the substrate below the vessel where it contacts the molten lithium material. More particularly, the substrate passes directly below the vessel with lithium composition from the vessel being applied to the substrate by means of an applicator, located in a position to transfer same. The contact of the molten lithium composition with the substrate is controlled by the applicator to enable a very thin film of such composition to be applied to the substrate. Preferably, the process takes place in an inert environment such as under argon or helium.

An indirect and gravity assisted method of transfer is preferred whereby the molten composition from the vessel is transferred to a rotating transfer roll which in turn transfers the molten composition to a substrate moving directly below the rotating transfer roll.

Preferably, a heat sink is maintained directly below the substrate and arranged so that the spacing between the applicator and the heat sink further defines the thickness of the coating.

It is preferred that the substrate be cooled essentially immediately after coating to rapidly solidify the metal coating onto the substrate. The heat sink is preferably a chilled member, typically a roller. Coating thickness is controlled by manipulation of a number of variables such as contact time between the substrate and the molten lithium, temperature of the substrate and the applicator, and temperature of the heat sink. Moreover, additional variables such as relative rate of movement of the substrate and the applicator further permit control of the coating thickness applied to the surface of the substrate. It will be understood that the chilling roll is preferably in contact with the uncoated surface of the substrate, and is preferably located directly vertically below the transfer roll or within a limited horizontal distance from the transfer roll. Thus, by controlling the position of the chilling roll relative to the transfer roll in the horizontal and vertical orientation, appropriate degrees of tension and cooling to the substrate are achieved to provide a desired thickness.

According to another aspect of the invention, the substrate or carrier foil may be a sheet substrate comprising a non-metallic material. For example, the process according to the present invention can be used for applying a coating of lithium, lithium alloy or compound containing lithium on a sheet already coated (on the side which does not receive the lithium) with positive electrode material, or a layer of an electrolyte and a positive electrode material. Alternatively, the substrate may constitute another portion of the battery. In still another alternative, the substrate may be a removable foil which is removed once the thin film lithium electrode is applied to the battery.

Accordingly, it is an object of the present invention to provide a process for coating a thin layer of metal, particularly lithium, onto a substrate by controlling the thickness and, therefore, reducing unnecessary waste by eliminating excess lithium and thereby ensuring good electrochemical performance of the battery in which the lithium electrode is used.

These and other objects, features and advantages will become apparent from the following description of the preferred embodiments, appended claims and accompanying drawings.

BRIEF DESCRIPTION OF THE DRAWING

The FIGURE is a schematic of an apparatus for use in practicing the process of the invention.

DETAILED DESCRIPTION OF THE PREFERRED EMBODIMENTS

As shown in the FIGURE, an apparatus for forming a thin lithium electrode is schematically illustrated and designated as 10. Apparatus 10 includes spool 12 which feeds substrate 14 in the form of a sheet 14 to coating station 16 and then onto a receiver spool 18. Receiver spool 18 is power driven and pulls sheet 14 past station 16. The vicinity of the coating station 16 is generally outlined by box 20, schematically illustrating a zone 20 where substrate sheet 14 and coating station 16 are maintained under a controlled atmosphere so as to eliminate oxygen, water vapor and other gases which could react with lithium. The controlled atmosphere of this zone 20 is preferably constituted by an inert gas such as argon or helium.

Prior to transporting (advancing) across coating station 16, substrate 14 is preferably a uniform material typically having no surface coating. If the substrate would otherwise react with the lithium to be coated on it, the substrate may be precoated with a nonreactive layer. For example, if an aluminum substrate is selected, it can react with lithium to form a brittle alloy. To prevent this from occurring, the aluminum substrate may be precoated with a nickel layer, which does not react with lithium. A thin layer of lithium composition is applied on the upper surface of substrate 14 as it advances through the coating station 16.

Metal coating station 16 includes vessel 22 which contains a molten metal composition 28, preferably lithium or alloy or compound thereof. To make sure that the lithium metal composition will be maintained in the molten state and will remain at a controlled temperature, a conventional heating element 32 connected to conventional AC power 34 may be provided. The vessel also has insulator 36. Preferably vessel 22 contains a stirrer 42 for circulating the molten material in the vessel to maintain a relatively uniform temperature distribution thereof. As also shown in the drawing figure, vessel 22 also includes a closed container 43 in which the molten material is contained and further sealed from adverse environmental contamination. Container 43 is surrounded by heating element 32 (which in turn is surrounded by insulator 36) and has an aperture 45 in its bottom wall registering with an aperture 47 in the mating bottom wall of insulator 36.

The applicator used to apply a layer of molten lithium composition on sheet 14 is a transfer roller 46 with an essentially smooth surface contour to facilitate formation of a smooth film. Alternatively, the surface contour of the transfer roller 46 may be textured so as to provide cavities for collecting desired quantities of molten material and transferring same to the substrate. Preferably, the applicator, in the form of transfer roller 46 is also provided with conventional heating means 48 for adequately controlling the temperature of the molten material on the surface of roller 46. It will be understood that transfer roller 46 rotates to enable the molten material present in the vessel to collect thereon, and then to rotate to contact the surface of the substrate 14 depositing material thereon. For this purpose, and as also shown in the drawing figure, roller 46 is disposed below and in registry with openings 45 and 47 with a close fit so as to rotate therein with its upper surface in direct moving contact with the bath of molten metal composition 28 disposed thereabove in container 45 such that the surface of roller 46 thereby continuously circulates in the bath. With the position of vessel 22 being above the substrate to be coated, the depositing of molten material onto the transfer roller 46, and the subsequent application of such deposit onto the substrate 14, is assisted by gravitational force.

Still referring to the figure, apparatus 10 also includes a chilling roll 52 which functions to cool the opposite or uncoated surface of the substrate 14 so as to rapidly solidify the molten metal thereon. Preferably, the chilling roll 52 is mounted on a support 54 which permits horizontal and vertical adjustment of the roll 52 with respect to the substrate 14 and the transfer roll 46. The adjustability of the chilling roll 52 in the horizontal and vertical direction allows for control of the coating thickness of the molten material. The transfer roller 46 and chill roll 52 are adjustable to define a distance between them corresponding to a desired thickness of the layer. Preferably, the chilling roll is disposed directly below the transfer roll or off-set some horizontal distance therefrom in the direction of advance of the substrate, so that the chill roll 52 and transfer roll 46 achieve appropriate degrees of tension and cooling for the substrate 14 to further control the thickness of the layer.

Preferably, the axis 56 around which the transfer roll 46 rotates is essentially perpendicular or transverse to the direction of movement of the substrate. Preferably, the transfer roll 46 rotates in a direction such that its lower surface moves in a direction opposite the direction of movement of the substrate 14 to effect a smoother coating. However, if desired, transfer roller 46 may rotate so that its lower surface moves in the same direction as the direction of movement of the substrate 14. Preferably, the chill roller 52 rotates in a direction opposite the direction of rotation of the transfer roller 46 to further apply tension to the substrate 14. However, if desired, the chill roller 52 may rotate in the same direction as the transfer roller 46. It will be understood by those skilled in the art that many combinations of rotations for the rollers may be used either in the same direction or in an opposite direction to that of the movement of the substrate.

To enable sufficient amount of molten material to be transferred from transfer roller 46 to substrate 14, transfer roller 46 must be rotating at a sufficiently rapid rate, for example, 10 to 100 rpm. Rotation which is too slow results in an insufficient amount of molten material to be transferred to the substrate.

It will be understood by those skilled in the art that the positioning of the chill roll 52 near the transfer roll results in essentially immediate cooling of the substrate by the transfer roll heat sink. Preferably, chilling roll 52 is a water cooled roller, that is, water is circulated in the interior 58 of chill roll 52. Other cooling fluids, such as freon and other refrigerants, may be substituted for water.

It should be understood that chilling roll 52 functions to control the coating thickness of molten material 60 on substrate 14 because chill roll 52 is in direct contact with the uncoated (underside) surface of substrate 14. In this arrangement, a tension is created on substrate 14 forcing it into contact with transfer roll 46. Depending on the amount of tension on substrate 14, the thickness of the metal coating can be effectively controlled. In addition, the horizontal distance defined by rollers 46 and 52 can also be used to control the thickness of the coating. It will be understood that to enable a very thin coating to be formed on substrate 14, chill roll 52 is adjusted toward transfer roll 46. Conversely, to produce a thicker coating on substrate 14, chill roll 52 is displaced horizontally or vertically from transfer roll 46.

The coating of a layer 60 of molten material onto substrate 14 is accomplished by first depositing a solid material, preferably metallic lithium, into container 43 of vessel 22 and energizing heaters 32 to melt the material to a molten state. Suitable openable closure elements (not shown) maybe provided in insulator 36 and container 43 for so loading container 43 with the solid metallic lithium, if desired. Stirrer 42 is then activated to maintain a relatively even temperature distribution in the molten material and prevent it from re-solidifying. Then substrate 14 is advanced past coating station 16 where transfer roll 46 is rotated substantially continuously to deposit molten material from vessel 22 onto substrate 14. Either immediately after molten material has been coated onto the substrate, or essentially simultaneous with coating onto the substrate, the substrate is brought into contact with chill roll 52 where heat is transferred from the molten material through the uncoated surface of substrate 14 and to the chill roll 52. Once coated and cooled, substrate 14 as so coated is advanced by and wound onto take-up roll 18. By using the apparatus and method described above, thin layers of lithium or alloys or compounds thereof are applied to a substrate forming a layer 60 thereon of a thickness less than about 100 microns and typically in a range of about 0.5 to about 40 microns in thickness. It is known that lithium is highly reactive, therefore, apparatus 10 must be maintained in a chemically inert environment with respect to lithium to prevent reaction thereof. Such environment must be essentially free of water, nitrogen and oxygen. Examples of suitable environments include argon, helium and neon, with an argon environment being particularly preferred and being maintained at ambient temperature and pressure. As will be readily understood by those skilled in the art from the foregoing description and drawing, container 43 of vessel 22 provides further isolation of the bath of molten metal composition 28 from contaminants which may be present both within and exterior to the controlled atmosphere zone 20.

Examples of substrates which may be coated in accordance with the present invention include nickel, copper, aluminum, tin and lead. Such metallic substrates are suitable as current collectors, therefore, a combination electrode/current collector is conveniently formed by the method of the invention. Other substrate materials may be selected as long as they are solid at the coating temperature, and essentially do not react with the coating material being applied. The substrate may be either solid like a foil, or porous like a screen.

According to another aspect of the invention, the substrate or carrier foil may be a sheet substrate comprising a non-metallic material. For example, the process according to the present invention can be used for applying a coating of lithium, lithium alloy or compound containing lithium on a sheet already coated (on the side which does not receive the lithium) with positive electrode material, or a layer of an electrolyte and a positive electrode material. Alternatively, the substrate may constitute another portion of the battery. In still another alternative, the substrate may be a removable foil which is removed once the thin film lithium electrode is applied to the battery.

In order to maintain the material in vessel 22 in a molten state when using metallic lithium, the vessel must be brought to a temperature greater than the melting point of lithium (180° C.). Maintaining a lithium bath between the melting point of pure lithium and about 400° C. produces good results. A bath temperature of about 250° C. is generally suitable.

The transfer roll 46 utilized to transfer molten material to the substrate, should have a continuous external surface which does not react with the lithium composition. Stainless steel is a suitable material for the roller. The roller 52 is preferably maintained at a temperature below the temperature of the molten material being applied. The chill roller 52 is also preferably of stainless steel or copper, or is at least clad on it's exterior, with stainless steel or copper.

Another factor which may be utilized to control coating thickness is the rotational speed of spool 18 which in turn controls the transport rate of substrate 14. A suitable speed for the substrate to move past coating station 16 is a rate of about 0.5 to about 10 meters/minute. A transport rate of about 3 meters/minute is particularly preferred.

Another factor which may be used to control coating thickness is the rotation speed of cooling roller 52. A suitable speed ranges from about 10 to about 100 rpm. Still another factor which can be used to control coating thickness is the temperature of the substrate prior to coating. If the temperature of the substrate is elevated, it is believed that the coating thickness will decrease. It is most economical to maintain the substrate at room temperature, however, some heating of the substrate does improve adhesion. Lowering the temperature of chill roll 52 leads to faster solidification and usually a thicker coating while increasing the temperature of the chilled roll can improve uniformity and reduce thickness.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. In a process for forming a layer of lithium on a substrate by utilizing a bath of molten lithium metal material or compound or alloy thereof, a heat sink disposed adjacent the bath, and a substrate having first and second opposed major surfaces, wherein the substrate is transported along a path which traverses between the bath and the heat sink, wherein a relatively constant quantity of the molten material is continuously applied to the first surface of the substrate, wherein the second surface of the substrate is immediately contacted with a heat sink opposite the site of molten metal application for causing solidification of the molten metal in the form of a thin film on the substrate, having a thickness less than about 100 microns, and wherein the bath, heat sink and substrate are surrounded by controlled atmosphere inert to lithium during the steps of applying and solidifying the metal material, an improved method of practicing such a process comprising in combination therewith the steps of:

a) maintaining said bath of molten material in a closed and heat insulated vessel disposed above said path and within said controlled atmosphere to thereby further isolate said bath from any contaminates in said surrounding controlled inert atmosphere, b) orienting said substrate first surface facing upwardly as it traverses between the bath and heat sink, and c) applying the molten metal material by allowing said molten metal material to flow by gravity from the bath via a gravity fed outlet of the vessel downwardly onto said upwardly facing substrate first surface.

2. In a process for forming a layer of lithium on a substrate utilizing a bath of molten lithium metal material or compound or alloy thereof, a heat sink disposed adjacent the berth, and a substrate having first and second opposed major surfaces, wherein the substrate is transported along a path which traverses between the berth and the heat sink, wherein a relatively constant quantity of the molten material is continuously applied to the first surface of the substrate, wherein the second surface of the substrate is immediately contacted with a heat sink opposite the site of molten metal application for causing solidification of the molten metal in the form of a thin film on the substrate, having a thickness less than about 100 microns, and wherein the bath, heat sink and substrate are surrounded by a controlled atmosphere inert to lithium during the steps of applying and solidifying the metal material, an improved method of practicing such a process comprising in combination therewith the steps of:

a) maintaining said bath of molten material in a heated and insulated vessel disposed above said path and disposed within said controlled inert atmosphere and having a gravity fed outlet for dispensing of the molten material from said bath, b) orienting said substrate first surface facing upwardly as it traverses between the bath and heat sink, and c) applying the molten metal material to said substrate first surface by providing an applicator disposed in a gravity flow path between the vessel outlet and said substrate first surface and by allowing said molten metal material to flow in the flow path substantially solely by gravity from the bath through said outlet of the vessel downwardly onto said upwardly facing substrate first surface via said applicator, said applicator comprising a rotary transfer roll with an essentially smooth surface provided in the gravitational flow path of said molten material from said bath outlet to said substrate first surface and operated for applying the molten material to the first surface of the substrate to thereby form a smooth film as said molten material solidifies on said substrate first surface.

3. The method according to claim 2 wherein the step of continuously applying is conducted by continuously circulating an upper portion of the outer surface of a rotary molten metal applicator in the outlet of the bath to thereby coat the applicator upper surface portion with the molten metal, and applying the molten metal as so coated on the applicator to the first surface of the substrate traversing below the bath by rotating the applicator coated surface portion downwardly onto the substrate first surface at a rotational speed in the range of about 10 to one hundred revolutions per minute such that centrifugally expelling the molten lithium from the rotating coated surface portion of the rotary applicator is avoided.

4. The method to claim 2 wherein the applicator rotates so as to cause movement of the applicator surface in a direction opposite the direction of movement of the substrate as the coated applicator surface is applied to the substrate first surface.

5. The method according to claim 2 wherein the applicator and heat sink are adjusted to define a distance between them operable to cause the film to have a thickness of between about 0.5 micron to about 40 microns.

6. The method according to claim 2 wherein the applicator is heated.

7. The method according to claim 2 wherein the rotary transfer roll has an axis transverse to the direction of movement of the substrate.

8. The method according to claim 1, wherein the bath is maintained at a temperature between the melting point of lithium and about 400° C.

9. The method according to claim 1, wherein the heat sink is in the form of a chilling roll.

10. The method according to claim 1 wherein an applicator is provided in the gravitational flow path of said molten material from said bath to said substrate first surface and is operable for applying the molten material to the first surface of the substrate, and wherein the applicator and heat sink are adjusted to define a distance between them operable to cause the film to have a thickness between about 0.5 micron to about 40 microns.

11. The method according to claim 4, wherein the bath consists essentially of metallic lithium.

12. The method according to claim 5, wherein the substrate comprises nickel, copper, iron and alloys and mixtures thereof.

13. The method according to claim 10, wherein the applicator comprises a rotary transfer roll and the surface of applicator is essentially smooth to thereby facilitate formation of a smooth film as said molten material solidifies on said substrate first surface.

14. The method according to claim 4, wherein the heat sink is positioned within a horizontal distance of the applicator so as to essentially simultaneously transfer heat away from the substrate as molten metal is deposited thereon.

15. The method according to claim 1, wherein the step of continuously applying is conducted by continuously circulating an upper portion of the outer surface of a rotary molten metal applicator in the outlet of the bath to thereby coat the applicator upper surface portion with the molten metal, and applying the applicator to the first surface of the substrate traversing below the bath by rotating the applicator coated surface portion downwardly onto the substrate first surface at a rotational speed in the range of about ten to one hundred revolutions per minute.

16. The method according to claim 15, wherein the applicator is heated.

17. The method according to claim 10, wherein the applicator is in the form of a roller with an axis transverse to the direction of movement of the substrate.

18. The method according to claim 15, wherein the applicator rotates so as to cause movement of the applicator surface in a direction opposite the direction of movement of the substrate as the coated applicator surface is applied to the substrate first surface.

19. The method according to claim 15, wherein the rate of movement of the substrate and the rate of movement of the applicator are relatively adjusted to vary the thickness of the layer applied to the substrate.

* * * * *